United States Patent

[11] 3,532,060

[72] Inventor Stephen G. Brush
 Thompson, Connecticut
[21] Appl. No. 605,767
[22] Filed Dec. 29, 1966
[45] Patented Oct. 6, 1970
[73] Assignee Alden Self-Transit Systems Corporation
 Westboro, Massachusetts
 a corporation of Massachusetts

[54] TRANSPORTATION SYSTEM AND VEHICLE
 13 Claims, 9 Drawing Figs.
[52] U.S. Cl. .................................................. 104/139
[51] Int. Cl. ..................................................... B61f 13/00,
 B60k 9/00
[50] Field of Search ........................................... 104/118,
 119, 130, 139; 105/141 — 148, 139;
 191/23 (A); 105/142 — 148

[56] References Cited
 UNITED STATES PATENTS
| | | | |
|---|---|---|---|
| 432,204 | 7/1890 | McLaughlin ................ | 104/139 |
| 650,997 | 6/1900 | Taylor ........................ | 104/139 |
| 943,539 | 12/1909 | Harling ....................... | 104/139 |
| 3,206,560 | 9/1965 | Parmenter .................. | 191/23(A)UX |
| 3,410,223 | 11/1968 | Miller ......................... | 104/139 |

Primary Examiner— Arthur L. La Point
Assistant Examiner—Richard A. Bertsch
Attorney—Willis M. Ertman ABSTRACT: The disclosed transportation system features a vehicle having mechanical guidance elements whose locations are coordinated with respect to and adjacent the vehicle's center of gravity and the vehicle's suspension roll center and a channel structure that supports cooperating fixed mechanical guidance elements and encloses the lower part of vehicle in a manner to afford rigid mechanical constraint for the vehicle while providing system control of propulsion and/or steering. Preferably the lower portion of the vehicle includes the drive unit and a vehicle load compartment, exposed above that channel, is connected to the vehicle drive unit by a relatively narrow coupling structure that is disposed in a slot in the upper surface of the channel. This construction provides improved vehicle guidance and control while providing protection for the system drive surface and system control elements against such factors as weather and vandalism. Slot surfaces additionally may provide auxiliary control functions such as steering and braking of the vehicle.

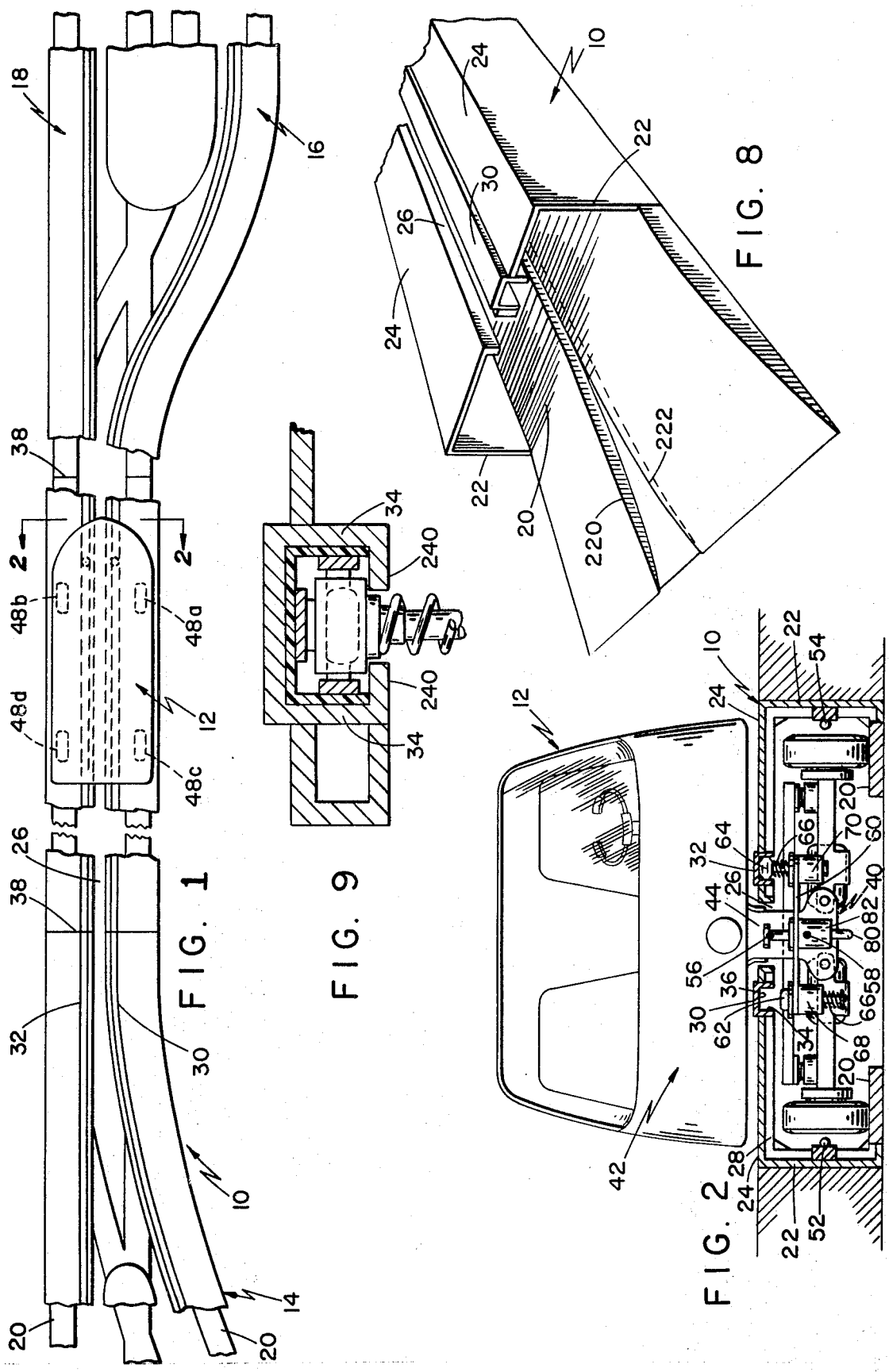

Patented Oct. 6, 1970

TRANSPORTATION SYSTEM AND VEHICLE

SUMMARY OF INVENTION

This invention relates to transportation systems in which vehicles can be driven on a central travel artery having facilities for automatically guiding the vehicles and more particularly to improvements in the structure of such arteries and vehicles.

It is a primary object of the invention to provide a transportation system of the type in which vehicles are automatically guided and/or propelled, which system includes an arrangement providing substantial mechanical constraint for the vehicles.

Another object of the invention is to provide an automated transportation system for passenger vehicles which provides significant mechanical constraint of the vehicle without obstructing the viewing ability of passengers in the vehicle.

Still another object of the invention is to provide an automated transportation guideway which is susceptible to functional and aesthetic incorporation into an adjacent landscape in a manner which minimizes the area necessary for exclusive use for vehicle passage.

A further object of the invention is to provide a vehicle control system in which drive portions of the vehicles travelling on this system are shielded from visual, acoustical and physical access without requiring passengers to be enclosed in a tunnel, thus minimizing unsightliness, noisy operation, and opportunities for vandalism.

A further object of the invention is to provide novel and improved guidance control arrangements coordinated with the center of gravity and the suspension roll center of the vehicle.

A further object of the invention is to provide novel and improved transportation control arrangement having control surfaces that augment vehicle functions such as steering and braking.

Another object of the invention is to provide a novel and improved vehicle guideway system which imposes rigid mechanical constraint on the vehicle with minimal resistance due to air flow conditions.

A further object of the invention is to provide a novel and improved vehicle guideway system having significant safety features from the standpoint of both the vehicle and its operation and the passenger.

In general the invention provides a vehicle travel artery in the form of a channel defined by a slotted platform spaced above a travel surface. The platform and travel surface are securely connected together to provide an enclosure for a substantial portion of the vehicle as the width of the slot in the platform is a small fraction of the width of the channel. A connecting structure in the form of a narrow waist is secured to the lower portion of the vehicle and mounted on the waist is a load carrying compartment, which in the preferred embodiment receives passengers. The lower (enclosed) portion of the vehicle contains the drive unit and preferably a power source for vehicle propulsion off the artery. While travelling on the artery, the waist is disposed in the slot on the platform and the vehicle is guided by means of a guide follower carried by the vehicle that is coupled mechanically to a guide element disposed in the channel below the platform. Surfaces of the channel slot preferably cooperate with the waist structure of the vehicle to provide auxiliary and supplemental steering and braking functions.

In a preferred embodiment, the platform extends laterally from both sides of the slot and dual guide elements are provided on the vehicle for selectively following the main artery or branch thereof, one guide element running along the undersurface of each platform portion adjacent the slot. The vehicle guidance system is symmetrical about an axis substantially coincident with the center of gravity of the vehicle and preferably the roll center of the vehicle's suspension system. Buffering techniques are employed to minimize the deviation of the drive unit and guidance system from the nominal travel path.

An automated transportation system constructed in accordance with the invention has increased reliability both from a functional standpoint and from a psychological standpoint. The rigid mechanical constraint provided by the channel in addition may be utilized to provide auxiliary or supplemental mechanical control functions. The system's travel surface is protected from vandalism and from the ingress of contaminants such as snow. The channel structure arrangement is amenable to manufacture in modular form thus facilitating construction of the system and replacement of individual sections of the system as necessary or desirable. The location of the vehicle guidance mechanism in coordinated relation to the vehicle's center of gravity and to the suspension roll center facilitates steering and also increases the steering reliability.

Other objects, features, and advantages of the invention will be seen as the following description of a particular embodiment of the invention progresses, in conjunction with the drawings, in which:

FIG. 1 is a plan view of a transportation system constructed in accordance with the invention;

FIG. 2 is a sectional view taken along the line 2–2 of FIG. 1 showing details of a vehicle and the guidance system;

FIG. 8 is a perspective view of the entrance to a system spur; and

FIG. 9 is a diagrammatic view of a protective guide configuration employed at switching junctions.

Figure 3:
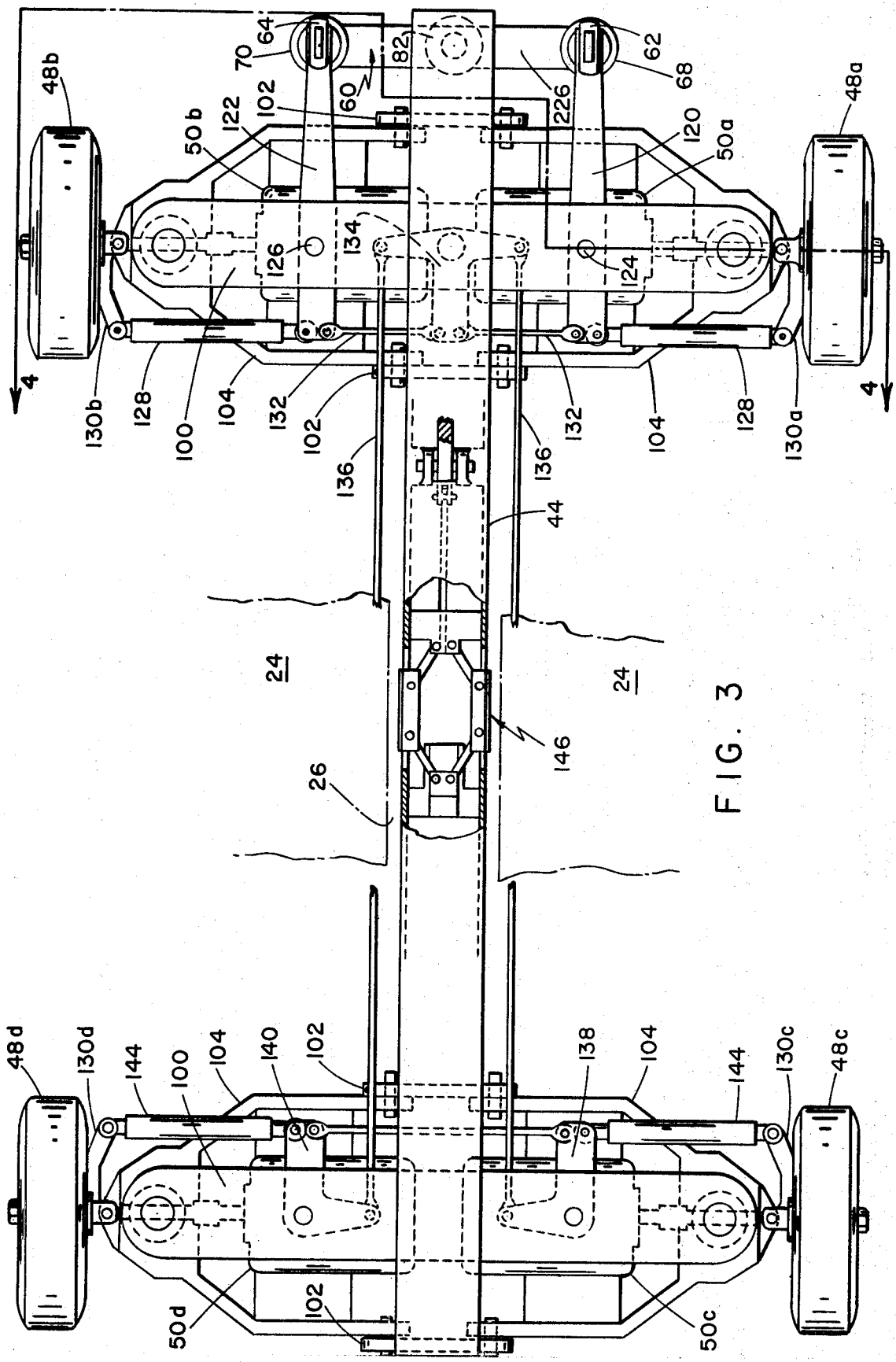
FIG. 3 is a top view of the drive unit employing the vehicle used on the system shown in FIG. 1.

With reference to FIGS. 1 and 2, there is provided a travel channel 10 for vehicle 12. As indicated in FIG. 1 this travel channel 10 has an entrance spur indicated at 14 and an exit spur indicated at 16 from a main line path 18. The travel channel includes travel surface 20 (indicated as two parallel tracks) (which may be at ground level, or above or below that level). Spaced above travel surface 20 by vertical side walls 22 are two horizontal platform sections 24 which are spaced to define a relatively narrow slot 26 (eight inches wide in a particular embodiment) between the inner ends of the platform sections 24 and extend outwardly therefrom. Reinforcing structural members 28 are provided to increase the rigidity of this channel structure. Secured in each platform section 24 is a guide structure 30, 32 of inverted configuration which provides at its under-surface a triplanar guide surface of two sidewalls 34 and an upper wall 36. In the simplified system shown in FIG. 1 the left hand guide structure 32, as viewed from the direction of vehicle travel illustrated in FIG. 1 may be considered to be the main line travel guide while the right hand guide structure 30 may be considered to be the spur control guide. The channel structure, including guide structures 30, 32 preferably is composed of a series of modular units joined at 38, which facilitate manufacture, system layout and repair when necessary.

Vehicle 12 has in its lower portion a drive unit 40 and in its upper portion a load carrying compartment 42 which in the illustrated embodiment is designed to carry passengers although it will be obvious that other configurations of the compartment may be used, for example for carrying freight. The drive unit and load carrying compartment are connected together with a relatively narrow coupling section or waist 44 to a width substantially less than the overall width of the vehicle. This coupling section may provide permanent or releasable connection of the drive unit to the load carrying compartment, depending on the design of the vehicle.

In drive unit 40, there are provided four individually motorized wheel units 48a; 48b, 48c, 48d, which are driven by coupled motors 50. Motors 50 may be selectively powered from the system via power supply conductors indicated at 52, 54 while on the travel channel 10 and also may carry a power source such as batteries mounted on the drive unit frame for propulsion while the vehicle is off the travel channel 10.

The location of the center of gravity of the vehicle is indicated at 56 in FIG. 2 and the location of the vehicle suspension's roll center is indicated at 58. A steering structure 60 is coupled to the front wheel units 48a, 48b and, through linkages, to the rear wheel units 48c, 48d. The steering structure includes two guide followers 62, 64 which cooperate with guide channels 30, 32 respectively. These guide followers are located symmetrically with respect to and closely adjacent center of gravity 56 and roll center 58 and also substantially in the same horizontal plane as these centers. The guide followers are biased to the position shown in FIG. 2 by springs 66 and when operated by solenoids 68, 70, are moved so that followers 64 engages channel 32 and follower 62 is disengaged from channel 30 in a switching operation. The two coils 68, 70 are connected in series to the system power source and energized automatically or by the closing of a manually controlled switch with system interlock. Thus when solenoids 68, 70 are energized, guidance of the vehicle on the travel artery is controlled by the left channel 32 while in the solenoid de-energized condition the vehicle steering is controlled by the right channel 30 in which runs along the entrance and exit spurs 14, 16 as indicated in FIG. 1. An auxiliary guide 80, operated by solenoid coil 82 is also secured to the steering structure 60 and provides auxiliary guidance in cooperation with a guideway at the entrance spur 14.

Figure 4:
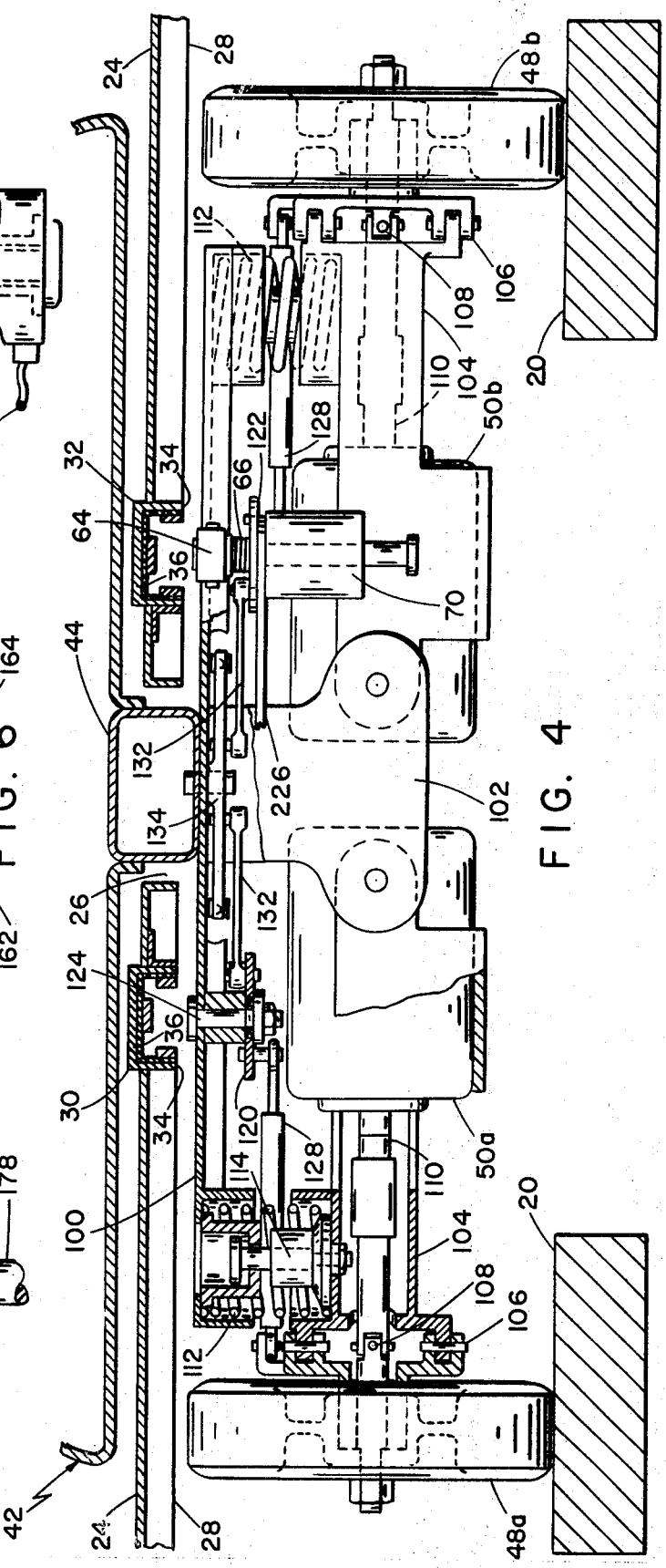
FIG. 4 is a sectional view of the structure taken along the line 4–4 of FIG. 3.

Additional details of the drive and steering mechanism may be seen with reference to FIGS. 3 and 4. The drive unit has a main support frame 100 and depending support members 102 to which are pivotally connected wheel suspension units 104. Each wheel unit includes a king pin unit 106 connected through universal joint 108 to drive shaft 110 or motor 50. Each unit 104 is resiliently spaced by springs 112 from the drive unit frame 100 which springs include buffers 114 that limit the amplitude of permitted vertical motion of the wheels 48.

Also supported from the frame 100 is a steering mechanism. That steering mechanism is responsive to inputs from the guide shoe structures 62, 64 which are mounted on arms 120, 122 respectively. Those arms are pivoted at 124, 126 respectively on the frame 100 and their rear ends are connected via linkages 128 to wheel steering arms 130. (A passenger controlled mechanism of conventional configuration is coupled to this steering mechanism for use when the vehicle is off the guideway and is decoupled when the vehicle is on the guideway.) The rear ends of the steering arms 120, 122 are also connected through links 132 to T-shaped coupling member 134 which is pivotally mounted on drive unit frame 100. Links 136 extend rearwardly along either side of waist 44 to steering elements 138, 140 which are similar to steering arms 120, 122, which are connected through links 144 to the steering arms 130c and 130d of the rear wheels. The turning relations of these rear steering units may be different from the turning relations of the front steering units as a function of the parameters of the guidance system and vehicle configuration. While in the disclosed embodiment the rear wheels are turned in the opposite direction from the front wheels, in certain embodiments it may be desirable that the front and rear wheels be turned in the same direction. Also, in certain embodiments, it may be desirable to use independent front wheel and rear wheel steering controls.

The platform surfaces defining slot 26 are vertical flange structures as indicated in FIG. 4 which cooperate with coupling section 44 to limit the amplitude of an oscillatory condition should such develop when the vehicle is operated at a particular speed and also to provide auxiliary braking surfaces that cooperate with braking mechanism 146 indicated diagrammatically in FIG. 3. The horizontal surfaces of members 24 also may serve as a skidway should a suspension component fail, for example; or where the actual vehicle speed is markedly less than the design value for superelevation at a curve.

Figure 6:
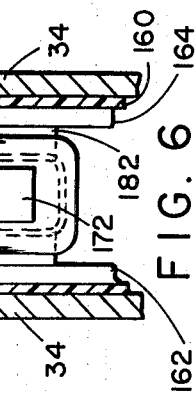
FIG. 6 is a sectional view taken along the line 6–6 of FIG. 5.
Figure 5:
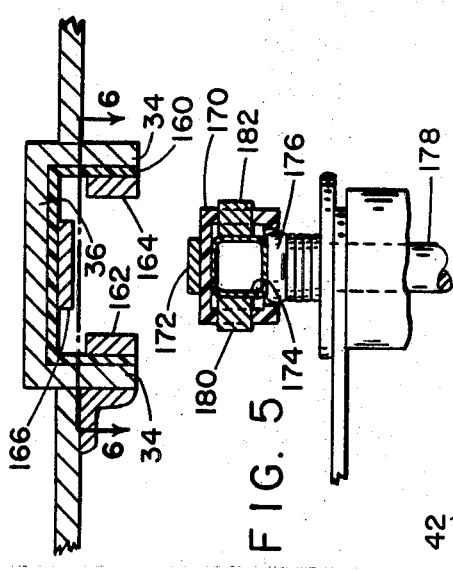
FIG. 5 is an enlarged view of one form of follower structure useful in the embodiment shown in FIGS. 1—4.

The guide followers 62, 64 carried by the vehicle may have a variety of configurations. A preferred configuration is shown in FIGS. 5 and 6. The shoe is of generally elongated rectangular configuration of a width to be easily interposed between the vertical guide surfaces 34, 36 of the guide channel 32. In the embodiment illustrated in FIGS. 5 and 6 a layer 160 of electrical insulation is disposed over guide walls 34, 36 and two power conductors 162, 164 are secured to side walls 34, 36 while a control signal conductor 166 is secured to upper wall 38. The guide shoe includes main body 170 of rigid plastic material such as polytetrafluoroethylene having a contact member 172 on its top surface and an elastomeric mass, for example, a flexible bladder structure 174 secured therewithin. The base of the bladder structure 174 has actuator plate 176 secured to it which in turn is secured to the armature rod 178. Secured on either side of the bladder structure is a carbon brush structure 180, 182 which extends through apertures in the sides of body 170. A top sectional view of the structure is shown in FIG. 6 with the guide follower inserted in the U-shaped guide rail. In that figure the armature rod 178 has forced slider 172 up into contact with conductor 166 and distorted the configuration of bladder 174, forcing the carbon brushes 180, 182 out through the apertures in the body 170 and into contact with the power conductors 162, 164. Leads (not shown) connect brushes 180, 182 to the motors 50 and slider 172 to the vehicle control system.

Figure 7:
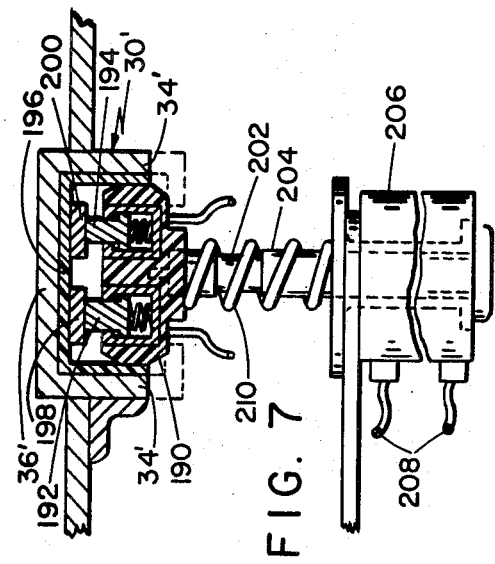
FIG. 7 is a sectional view of a second embodiment of a follower structure suitable for employment in the vehicle shown in FIGS. 1—4.

A second form of guide follower structure is illustrated in FIG. 7 and likewise includes a plastic body 190 in which spring loaded electrical contacts 192, 194 are mounted. The guide channel 30' has on its upper surface 36 an electrically insulating coating 196 on which are mounted, in spaced relation, two electrical conductors 198, 200. The side walls 34, 34 of the channel have bonded thereto a low friction coating which cooperates with the side walls of the guide shoe 190 and provides vehicle guidance. The guide shoe body 190 is mounted on rod 202 which is secured to the armature 204 of solenoid structure 206 and when the solenoid 206 is energized by means of leads 208 armature 204 is pulled down into the center of coil 206, retracting body 190 from the guide channel 30' against the force of biasing spring 210.

A similar arrangement is utilized with the left guide except that the shoe is normally biased out of engagement with its cooperating guide channel and on energization of its solenoid coil it is moved upwardly into engaged position.

The entry to the travel channel 10 is indicated in FIG. 8. That entrance has the vehicle enclosing structure and guide channel 30 exposed. In the base of the structure there is provided a flared entrance guide having flared surfaces 220, 222, which cooperate with auxiliary steering control 80 mounted on the link 226 connected between the two steering arms 120, 122. As the vehicle is entering the guideway solenoid 82 is energized to lower guide shoe 80 into position for engagement by either surface 220 or 222. As the vehicle moves forward into the guideway the cooperation of surfaces 220, 222 with shoe 80 steers the vehicle so that the guide shoe 62 properly mates with guide channel 30. Once within the entrance spur 14, the steering control in the passenger compartment is automatically disabled so that steering of the vehicle along the travel artery is controlled by the guide shoe 62, 64 that is engaged. While on the artery, the vehicle is propelled by the system electric power supplied through conductors 52, 54 to operate the desired number of motors 50. After the vehicle has been merged onto the main line 18 of the guideway the solenoids 68, 70 are energized to transfer steering control from guide channel 30 to guide channel 32. When it is desired to leave the central artery, the solenoids 68, 70 are deenergized, withdrawing guide shoe 64 after shoe 62 has been engaged. In that condition the vehicle will automatically exit at the next exit spur 16.

At such switching junctions, in order to insure that switching cannot be performed at the time that the vehicle is moving through such a junction, lips 240 are formed at the lower ends of the vertical guide surfaces 34 so that an enclosure for each guide shoe is provided as indicated in FIG. 9. This positive mechanical interlock prevents a switching operation during the relatively short interval that the vehicle 12 is moving through a switching junction.

As the guidance structure is positioned near the center of gravity of the vehicle and the supension roll center displacement of the guide shoes and coupling portion 44 with respect to the guideway slot due to vehicle rolling is minimized. That guidance structure may utilize air bearing features as an alternate to mechanical contact, for example. The structural interrelationship of this transportation provides improved coordinated steering control for a vehicle moving on an automated transportation system. The guideway is compact and may be landscaped as desired to provide an aesthetically pleasing structure while serving to reduce vehicular noise and also to protect the guideway system components from vandalism and weather. The channel structure may house mechanical elements, such as cables, for driving the vehicles; as well as serve as a shielded transmission channel for system control signals or other communications. The channel configuration is particularly adapted for modular construction in relatively short units which facilitate both the laying of the guideway and the replacement of sections when necessary. While the transportation system has particular advantages in transporting freight or passengers, it obviously may be used at smaller scales, for example in toys or other amusement devices.

Therefore, while particular embodiments of the invention have been shown and described, various modifications thereof will be obvious to those skilled in the art and therefore it is not intended that the invention be limited to the disclosed embodiments or to details thereof.

I claim:

1. A transportation system comprising:
    an enclosed channel-like central travel artery having at its bottom a roadway and a platform surface spaced above said roadway and having a narrow slot running in a direction generally parallel thereto;
    a guide element below said platform surface running in a direction generally parallel to said slot;
    a vehicle including:
    a drive unit including means for propelling said vehicle along said roadway, a guide follower system for coupling to said guide element to guide said vehicle on said artery, said guide follower system including two guide follower units located symmetrically with respect to and closely adjacent the center of gravity and roll center of the vehicle and disposed at least in part between horizontal planes extending through said center of gravity and said roll center, each said guide follower unit including a follower element disposed above said drive unit for engaging a corresponding guide element and an actuator element for moving the follower element into and out of engagement with its corresponding guide element; and
    a load carrying compartment spaced above said drive unit and connected thereto by a waist of width substantially less than the overall width of said vehicle, said unit and compartment being arranged to receive said platform surface therebetween with said waist passing through said slot when said vehicle is on said roadway, and said guide follower units being disposed on opposite sides of said waist.

2. The system of claim 1 wherein said vehicle includes front and rear wheel units and said guide follower system is coupled to steering mechanism for steering at least one of said wheel units.

3. The system of claim 1 wherein said guide element is a member shaped to receive said guide follower element and each said guide follower element includes a movable shoe for selectively slidably responding to a surface of said shaped member.

4. The system of claim 3 wherein an electrified surface is provided within said shaped member and said shoe includes a resiliently mounted contact member for engaging said electrified surface and transmitting power to said vehicle.

5. The system of claim 1 wherein said vehicle has a self-contained power source and manually operable steering apparatus for driving off said artery and said system has a source of power for said vehicle when driving on said artery.

6. The system of claim 5 wherein said vehicle has front and rear wheels each driven by a separate motor.

7. The system of claim 6 wherein the motors driving said front wheels are powered by said system power source and the motors driving said rear wheels are powered by said self-contained power source.

8. A transportation system comprising an enclosed channel-like central travel artery having at its bottom a roadway and a platform surface spaced above said roadway and having a narrow slot running generally parallel thereto, a guide element below said platform surface running generally parallel to said slot, each said guide element being a shaped member and having two electrified surfaces, and a vehicle including a drive unit including a guide follower for coupling to said guide element to guide said vehicle on said artery, each said guide follower including a shoe comprising a support member having surfaces for selectively slidably engaging the interior surfaces of said shaped member, a pair of contact members movably mounted in said support member, an elastomeric member mounted in said support member between said contact members, and a pusher arranged in said support member adjacent said elastomeric member for distorting said elastomeric member upon contact with said shaped member to press said contact members firmly against said electrified surfaces, and a load carrying compartment spaced above said drive unit and connected thereto by a waist of width substantially less than the overall width of said vehicle, said unit and compartment being arranged to receive said platform surface therebetween with said waist passing through said slot when said vehicle is on said roadway.

9. A transportation system comprising an enclosed channel-like central travel artery having at its bottom a roadway and a platform surface spaced above said roadway and having a narrow slot running generally parallel thereto, two shaped guide elements below said platform surface running generally parallel to said slot, and a vehicle including a drive unit including a guide follower system for coupling to said guide elements to guide said vehicle on said artery, said guide follower system including two movable shoes for respectively selectively slidably engaging surfaces of said shaped members, each said shoe being mounted on a support arm extending to the front of said vehicle, the position of each shoe relative to its corresponding guide element being controlled by an elongated member extending into a solenoid coil, each of said shoes having an engaged position in which the shoe is engaged with said surfaces of said element, and a retracted position in which the shoe is fully withdrawn from said guide element, each shoe further having associated therewith a biasing member, one of said biasing members biasing its shoe in its engaged position, the other biasing member biasing its shoe in its retracted position, said solenoids when energized overcoming said biasing members and reversing the positions of said shoes, and a load carrying compartment spaced above said drive unit and connected thereto by a waist of width substantially less than the overall width of said vehicle, said unit and compartment being arranged to receive said platform surface therebetween with said waist passing through said slot when said vehicle is on said roadway.

10. A transportation system comprising an enclosed channel-like central travel artery having at its bottom a roadway and a platform surface spaced above said roadway and having a narrow slot running generally parallel thereto, two guide elements below said platform surface running generally parallel to said slot, and a vehicle including a drive unit including a guide follower system for coupling to said guide elements to guide said vehicle on said artery, said guide follower system including two movable shoes for respectively selectively slidably engaging surfaces of said guide elements, each said shoe being mounted on a support arm extending to the front of said vehicle, the position of each shoe relative to its corresponding guide element being controlled by a vehicle carried control, each of said shoes having an engaged position in which the shoe is engaged with said interior surfaces of said element, and a retracted position in which the shoe is fully withdrawn from said guide element, each shoe further having associated therewith a biasing member, one of said biasing members biasing its shoe in its engaged position, the other biasing member biasing its shoe in its retracted position, and a load carrying compartment spaced above said drive unit and connected thereto by a waist of width substantially less than the overall width of said vehicle, said unit and compartment being arranged to receive said platform surface therebetween with said waist passing through said slot when said vehicle is on said roadway.

11. A transportation system comprising an enclosed channel-like central travel artery having at its bottom a roadway and a platform surface spaced above said roadway and having a narrow slot running generally paralled thereto, said travel artery including a main line portion and a spur line portion joined together at a junction, each said line portion having a guide element associated therewith, and each said guide element being disposed below said platform surface and running generally parallel to said slot, each said guide element, at said junction, including structure for preventing release of a guide follower coupled to it as said vehicle moves through said junction and a vehicle including a drive unit including a guide follower for coupling to said guide element to guide said vehicle on said artery, and a load carrying compartment spaced above said drive unit and connected thereto by a waist of width substantially less than the overall width of said vehicle, said unit and compartment being arranged to receive said platform surface therebetween with said waist passing through said slot when said vehicle is on said roadway.

12. The system of claim 11 wherein each said guide element is a U-shaped member and each said guide follower element includes a reciprocally movable shoe for selectively slidably engaging interior surfaces of said U-shaped member and said release preventing structure includes a flange at the open end of each of said U-shaped members.

13. A vehicle for use on a controlled transportation system having a shaped mechanical guide element of U-configuration extending along a vehicle travel artery comprising:
a drive unit for propelling the vehicle along the artery;
a load carrying compartment spaced above said drive unit and connected thereto by a waist of width substantially less than the overall width of the vehicle; and
a steering unit including a guide follower comprising a reciprocally movable shoe for selectively slidably engaging a surface of said U-shaped member for steering said vehicle on said artery, said shoe including a support body, a pair of guide members movably mounted in said body, an elastomeric member mounted in said support body between said guide members, and a pusher arranged in said support body adjacent said elastomeric member for distorting said elastomeric member upon contact of said shoe with said U-shaped member to press said guide members firmly against surfaces of said U-shaped member, said guide follower being located in said space between said drive unit and said compartment in close proximity to and in substantially the same horizontal plane as the center of gravity of said vehicle.